Sept. 26, 1961 H. MILLER 3,001,318
LURE WITH SPINNERS
Filed Oct. 28, 1958
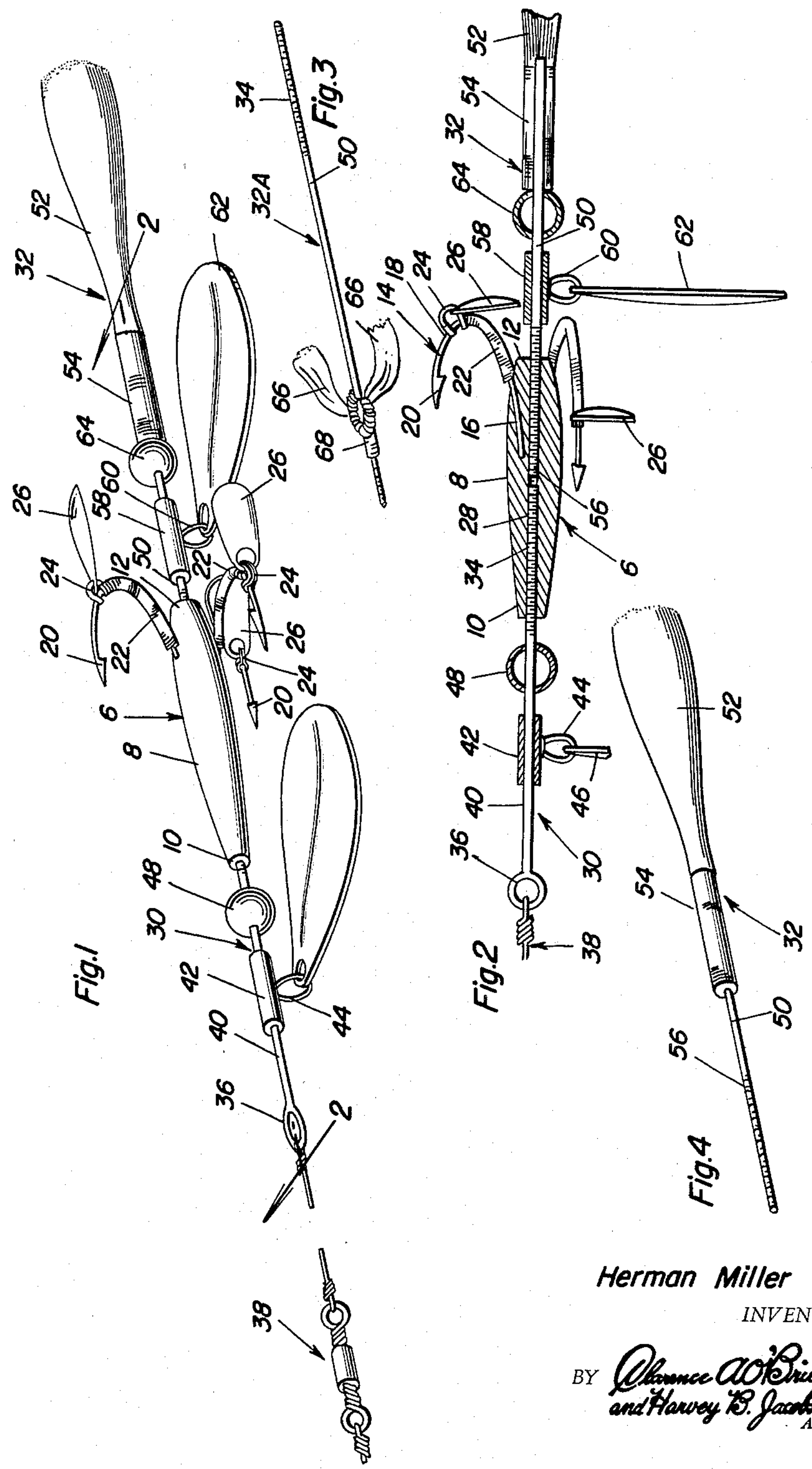
Herman Miller
INVENTOR.
BY Clarence A. O'Brien
and Harvey B. Jacobson
Attorneys 3,001,318

LURE WITH SPINNERS

Herman Miller, General Delivery, Wheeler, Tex.

Filed Oct. 28, 1958, Ser. No. 770,204
2 Claims. (Cl. 43—42.13)

This invention pertains to artificial fishing bait, particularly a lure having a plug or body shaped to represent a minnow and equipped with added fishhooks and complemental cooperating spinners which function to attract the fish and impart an animated and life-like action to the over-all bait.

With a view toward advancing the art a bait is offered which in part is provided with a novel arrangement of fishhooks. To this end several fishhooks have shank portions fixed at equidistant circumferentially spaced points to a rear end of the lure body, each hook being equipped with a freely movable spinner.

Each spinner-equipped fishhook is provided with a snug-fitting coil spring with an inner end bearing against the surface of the body and an outer end spaced from the barbed end of the hook, a clevis being slidingly mounted between the barb and the spaced end portion of the coil spring.

The concept also comprehends the adoption and use of a body or plug construction as briefly covered above and wherein a bore extends axially through the forward and rearward ends of the body, said bore being screw-threaded to accommodate screw-threaded shank portions on attachable and detachable shaft members serving as spindles.

It is desired to utilize shaft members at the rear which carry varying types of ornaments and to feature a plurality of interchangeable ornamental shafts which function as attachments and which when properly employed serve to change the appearance of the over-all lure at will.

Novelty is also predicated on readily attachable and detachable front and rear shafts which provide spindles and wherein the spindle portion of each serves to accommodate the sleeve, the sleeve having an eye and said eye having a spoon-type spinner attached thereto. The last named spinners are large, compared to the first named spinners, and the various spinners cooperate with each other in not only drawing attention of a fish to the lure but imparting action to the lure which action alone results in attracting and catching more fish.

Changes in form, construction and re-arrangement of components and parts may be made by those skilled in the art without departing from the spirit and scope of the invention as expressed in the invention as claimed.

In the drawing:

FIG. 1 is a perspective view of the complete ready-to-use spinner-equipped lure constructed in accordance with a preferred embodiment of the invention.

FIG. 2 is a section, with parts appearing in elevation, taken on the plane of the line 2—2 of FIG. 1.

FIGS. 3 and 4 are perspective views of ornamental attraction-type lure attachments applicable to the rear or trailing end of the lure body.

Referring now to the drawing and particularly to FIGS. 1 and 2, the lure body, which may be of any appropriate material and size, is denoted at 6 and is intended to represent an artificial bait or minnow. It is therefore elongated and has a relatively stout median or intermediate portion 8, a gradually tapering forward half portion terminating in a reduced leading end 10 and a similarly constructed and reduced rear end portion 12. A cross-section through the lure body would show the same to be approximately circular. As mentioned the rear or trailing end portion of the lure body is equipped at circumferentially spaced equidistant points with several conventional types of fishhooks 14. The shank 16 of each hook is embedded or otherwise fixedly joined to the body so that the bend 18 of the hook radiates from the peripheral surface of the body and terminates in a barb 20 which points toward the median portion 8. On each shank portion there is a resilient coil spring 22 which has one end abutting the surface of the body and the other end spaced from the barb 20. In this space there is a clevis 24 to which a small spoon-type spinner 26 is pivotally connected.

The body or plug has an axial passage extending through the forward and rearward ends and said passage is screw-threaded from end to end and as denoted at 28. The half-portions of the passage serve to accommodate forward and rearward changeable and interchangeable plug attachments. The forward attachment is denoted generally at 30 and the rearward one at 32. The screw-threaded shank portion 34 of the shaft of this attachment 30 is screwed into the bore and there is an eye 36 at the other end to accommodate the fishing line swivel means 38. That portion of the shaft extending beyond the end 10 is smooth and functions as a spindle 40. There is a sleeve 42 slidingly and rotatably mounted on the spindle and provided with an eye 44 to which the inner end of a relatively large spoon-type spinner 46 is linked and thus freely connected. There is also an end thrust bearing or ball 48 provided and this is mounted on the shaft between the rear end of the sleeve 42 and the forward end 10 of the body.

While interchangeable types of attachments 30 may be made for the forward end it has usually been the practice to utilize the one herein shown and so far described. However, on the rearward end varying attachments, that is attachments which are dressed differently will be utilized. One attachment for example is denoted generally by the numeral 32 as already suggested. A similar attachment would be the one at 32*a* in FIG. 3. The attachment 32 is provided at the rear end of the shaft 50 with a tassel-like ornament 52 bound or fixed in place in any suitable manner as at 54 in FIG. 2. This tassel may be made up in various shapes and ways and constructed from horsehair, hackle, limber fibers and so on as is customary in the art. The forward screw-threaded end or shank portion 56 screws into the half portion of the screw-threaded bore 28. The median smooth-surfaced portion functions as a spindle and serves to accommodate the sleeve 58 provided with an eye 60 to which the large spoon-type spinner 62 is freely connected. There is a ball or bearing 64 on the shaft interposed between the sleeve and the bound end portion 54 of the ornament. In lieu of the ornament 52 I use flies or similar ornaments 66 attached at 68 to the shaft in the manner shown in FIG. 3.

It will be evident that the bore through the body or plug 6 is screw-threaded from end to end. With this arrangement the respective shank portions of the forward and rearward shafts are screwed into place and thus pressed firmly together with the result that the abutting ends jam together and accidental displacement of the shafts is thus prevented. The portions of the bore to accomplish this are, of course, properly threaded. It is also to be noted that the shafts on all of the various attachments or attachable components have the properly prepared cross-sections and threads to permit the changing of the units. This allows one to own numerous attachments all having threaded shafts of the same cross-section and making it possible to change the dress of the over-all lure as desired.

It will be further noted that the triple arrangement of hooks 14 on the rearward end portion of the plug 6 is a novel adaptation particularly when one considers the fact that the hooks thus located are not only in the strike zone of an expected fish, they have their small freely movable spinners acted on by the sleeve-like spacers and coil springs 22.

Note should be made in respect to the distance between the point of the hooks and the spinners and how the spinners miss each hook point the same distance when the fish strikes, the front spinner goes in against the hook body. The fisherman can adjust the distance by screwing the tail in snug against the hook body.

In addition it will be evident that with the construction disclosed the entire assembly comprising the hook-equipped body or plug and front and rear shafts and means carried thereby rotates when pulled through the water in a manner to attract and lure the prey. During the rotating action the small spoon-like spinners 26 flutter and move in an indescribable manner. At the same time, the sliding and rotating sleeves 42 and 58 and their freely attached spinners 46 and 62 function and act somewhat independently with the result that the relative motion and peculiar activity between the parts relative to each other results in providing the user with a genuinely effective lure. The tiny or small spinners 46 have a tendency to hide the barbed ends of the hooks. In addition the out-of-balance vibration from the larger spinners generates motion and action. Further, the coil spring help hide the hooks and when a hook is jerked in a fish's mouth and sinks, the spring assists in setting the hook. It has already been pointed out that the concept involves the use of a coil spring 22 on each bent portion of each hook and that the spring is similar to a resilient sleeve. It may be made long or short so that the distance between the clevis 24 and spinner can be varied. In fact, the springs may be sufficiently long that the clevises are close to the barb of each hook so that when a catch is made the passing of the barb through the mouth of the fish tends to push the clevis back putting the spring under tension and using the clevis and spinner as a means to help to set the hook in the fish's mouth.

Minor changes in shape, size, materials and rearrangement in the over-all combination adaptation may be resorted to in actual practice without departing from the spirit of the invention or the scope of the invention as claimed.

What is claimed as new is as follows:

1. A fishing lure comprising an elongated body representing a minnow and having an axial bore extending therethrough and screw-threaded from end-to-end, axially aligned readily applicable and removable forward and rearward shafts having adjacent inward end portions screw-threaded and threaded into the respective forward and rearward portions of the screw-threaded bore, the rearward shaft having an ornament fixed thereon at an outward end of the shaft and having a median smooth portion constituting a spindle, a first sleeve slidable and rotatable on said spindle, a large spinner pivotally hitched to said sleeve, a plurality of circumferentially spaced fishhooks having shank portions joined at equidistant places to the rearward end portion of said body, a coil spring surrounding the shank of each fishhook, the inner end of said spring bearing against said body and the outer end of the spring being spaced from a barb on the hooked end portion of said fishhook, a clevis slidable on said fishhook between the barb and a cooperating outer end of the coil spring, and a spinner pivotally attached to said clevis, the spinners on said fishhooks being relatively small compared to the first-named spinner.

2. The structure defined in claim 1, and in combination, a second relatively large spinner pivotally hitched to a sleeve slidably and rotatably mounted on a median portion of the forward shaft, whereby to thus provide large spinners to the front and rear of the body operating independently on their respective forward and rearward shafts, and spring-biased relatively small spinners at the rear of the body cooperable with the first-named large spinner.

References Cited in the file of this patent

UNITED STATES PATENTS

| | | |
|---|---|---|
| 289,508 | Dawson | Dec. 4, 1883 |
| 1,495,927 | Roland | May 27, 1924 |
| 1,526,133 | Gilmore | Feb. 10, 1925 |
| 1,948,938 | Danielczuk | Feb. 27, 1934 |
| 1,977,141 | Pflueger | Oct. 16, 1934 |
| 2,069,724 | Pflueger | Feb. 2, 1937 |
| 2,397,968 | Lind | Apr. 9, 1946 |